US007050808B2

(12) United States Patent
Janusz et al.

(10) Patent No.: US 7,050,808 B2
(45) Date of Patent: May 23, 2006

(54) METHOD AND SYSTEM FOR TRANSMITTING, RECEIVING AND COLLECTING INFORMATION RELATED TO A PLURALITY OF WORKING COMPONENTS

(75) Inventors: Gerald E. Janusz, Louisville, KY (US); Stephen C. Payne, Louisville, KY (US); Timothy J. Prell, Louisville, KY (US); Paul van der Pol, Louisville, KY (US)

(73) Assignee: Telemics, Inc., Louisville, KY (US)

( * ) Notice: Subject to any disclaimer, the term of this patent is extended or adjusted under 35 U.S.C. 154(b) by 584 days.

(21) Appl. No.: 09/875,529

(22) Filed: Jun. 6, 2001
(Under 37 CFR 1.47)

(65) Prior Publication Data

US 2002/0009975 A1    Jan. 24, 2002

Related U.S. Application Data

(60) Provisional application No. 60/210,133, filed on Jun. 7, 2000.

(51) Int. Cl.
*H04Q 7/20* (2006.01)
*H04Q 7/24* (2006.01)
*G08B 23/00* (2006.01)

(52) U.S. Cl. .................. 455/445; 455/11.1; 455/16; 455/41.2; 455/41.3; 370/338; 340/517; 340/518; 340/519; 340/520; 340/521; 340/870.02; 340/870.03; 340/870.09; 340/870.16

(58) Field of Classification Search ............... 455/445, 455/11.1, 16, 41.2, 41.3; 370/338; 340/517–521, 340/870.02, 870.03, 870.09, 870.16
See application file for complete search history.

(56) References Cited

U.S. PATENT DOCUMENTS 2,346,889 A    4/1944    Wullschleger
3,986,119 A   10/1976    Hemmer, Jr. et al.
4,176,254 A   11/1979    Tuttle et al.

(Continued)

OTHER PUBLICATIONS

International Search Report for International Application No. PCT/US01/40893.

(Continued)

*Primary Examiner*—George Eng
*Assistant Examiner*—Un C. Cho
(74) *Attorney, Agent, or Firm*—Foley & Lardner LLP

(57) ABSTRACT

A method and system for transmitting, receiving, and collecting information related to a plurality of working components, such as street lamps, allows for efficient and effective monitoring and controlling of working components through short-distance radio communications at low power levels. In a preferred implementation of the present invention, a communications network includes a plurality of transceiver modules, each of which is secured and operably connected to a working component. These transceiver modules transmit and receive radio communications or "messages" representative of the status of the working component from one another in a controlled manner, with each message ultimately being directed to an area control module. At the area control module, the messages are collected and transferred to a network support server, which analyzes the information and data contained in such messages, and then transfers such information and data to control and display units through a computer network for review by end users. The control and display units further allow for control of the working components by initiating transmission of radio communications containing instructions or programming code to one or more particular transceiver modules.

43 Claims, 11 Drawing Sheets

U.S. PATENT DOCUMENTS

| | | | |
|---|---|---|---|
| 4,257,029 A | 3/1981 | Stevens | |
| 4,406,995 A | 9/1983 | May | |
| 4,580,099 A | 4/1986 | Zetti | |
| 4,598,345 A | 7/1986 | Kleeman | |
| 4,630,035 A | 12/1986 | Stahl et al. | |
| 4,691,341 A | 9/1987 | Knoble et al. | |
| 4,922,154 A | 5/1990 | Cacoub | |
| 4,968,978 A | 11/1990 | Stolarczyk | |
| 4,993,059 A | 2/1991 | Smith et al. | |
| 5,031,082 A | 7/1991 | Bierend | |
| 5,099,348 A | 3/1992 | Huddleston et al. | |
| 5,142,396 A | 8/1992 | Divjak et al. | |
| 5,220,321 A | 6/1993 | Sauer | |
| 5,254,908 A | 10/1993 | Alt et al. | |
| 5,397,963 A | 3/1995 | Manson | |
| 5,479,159 A | 12/1995 | Kelly et al. | |
| 5,481,535 A | 1/1996 | Hershey | |
| 5,596,501 A | 1/1997 | Comer et al. | |
| 5,608,171 A | 3/1997 | Hunter et al. | |
| 5,621,662 A | 4/1997 | Humphries et al. | |
| 5,623,256 A | 4/1997 | Marcoux | |
| 5,646,844 A | 7/1997 | Gudat et al. | |
| 5,682,142 A | 10/1997 | Loosmore et al. | |
| 5,706,191 A | 1/1998 | Bassett et al. | |
| 5,740,363 A | 4/1998 | Siep et al. | |
| 5,828,178 A | 10/1998 | York et al. | |
| 5,845,230 A | 12/1998 | Lamberson | |
| 5,867,820 A | 2/1999 | Cureton et al. | |
| 5,898,384 A | 4/1999 | Alt et al. | |
| 5,900,801 A | 5/1999 | Heagle et al. | |
| 5,907,491 A | 5/1999 | Canada et al. | |
| 5,921,659 A | 7/1999 | Hunt et al. | |
| 5,936,362 A | 8/1999 | Alt et al. | |
| 5,959,529 A | 9/1999 | Kail, IV | |
| 5,962,991 A | 10/1999 | Levy | |
| 5,971,597 A | 10/1999 | Baldwin et al. | |
| 6,028,396 A | 2/2000 | Morrissey, Jr. et al. | |
| 6,029,092 A | 2/2000 | Stein | |
| 6,035,266 A | 3/2000 | Williams et al. | |
| 6,058,374 A | 5/2000 | Guthrie et al. | |
| 6,112,127 A | 8/2000 | Bennett | |
| 6,115,580 A * | 9/2000 | Chuprun et al. | 455/1 |
| 6,118,860 A | 9/2000 | Hillson et al. | |
| 6,119,076 A | 9/2000 | Williams et al. | |
| 6,119,125 A | 9/2000 | Gloudeman et al. | |
| 6,204,615 B1 | 3/2001 | Levy | |
| 6,218,958 B1 * | 4/2001 | Eichstaedt et al. | 340/7.6 |
| 6,339,745 B1 * | 1/2002 | Novik | 701/208 |
| 6,437,692 B1 * | 8/2002 | Petite et al. | 340/540 |
| 6,490,459 B1 * | 12/2002 | Sugaya et al. | 455/517 |
| 6,535,498 B1 * | 3/2003 | Larsson et al. | 370/338 |
| 6,717,529 B1 * | 4/2004 | Belvin et al. | 340/870.16 |
| 2002/0065058 A1 * | 5/2002 | Gatherer et al. | 455/272 |
| 2003/0190912 A1 * | 10/2003 | Jampolsky et al. | 455/423 |

OTHER PUBLICATIONS

CTR ControlTalk Relay, Blackbird Intelligent Solutions in Lighting Control, 1994, pp. 1-2, PDS-1002, Blackbird, USA.

Kukjae Radio Controls Co., LTD, RadiNet—The Best in Radi, http://www.rctech.co.kr/eng/u2/je_2.html, 1999, Korea.

European Search Report, European Patent Office, Dec. 9, 2004.

Jubin et al., The DARPA Packet Radio Network Protocols, Proceedings of the IEEE, Jan. 1987, pp. 21-32, vol. 75, No. 1, Institute of Electrical and Electronics Engineers, Inc., New Jersey.

* cited by examiner

Main Menu

○ Home

Diagnostic Reports
- Network Status
- Faults
- Fault Free Fixtures
- Show Map

Fixture Manager
○ Fixture Manager

Work Order Manager
- Maintenance History
- View Work Orders

Fixture Information for 47 E. Frambes Corner of Tuller

| Fixture | Fixture Description | Component Name [Manufacturer, Model Number] | Component Specs | Sub-Component/ Manufacturer/ Model | Sub-Component Specs | Fixture Modification History |
|---|---|---|---|---|---|---|
| 47 E. Frambes Corner of Tuller | Emergency Lighting and Phone System | Access Point Hardware Unit | Phase I AP Unit | Access Point Processor | Phase I AP Processor | See History |
| | | Emergency Phone [GAI-tronics 293] | | Emergency Phone Line [GAI-tronics 293] | | |
| | | Emergency Strobe [GAI-tronics 530FB] | 120 Vac @ 60 Hz 0.69 Amps Strobe 50.5A for 3ms | Compact Fluorescent Quad Beacon Tube Lamp [Panasonic FDS13E41.U/2] | Power 13 Watt | |
| | | | | Xenon Strobe Tube Lamp [GAI-tronics 24851-007] | Flash Rate 65 FPM | |

[ Modify Information ] — 224

METHOD AND SYSTEM FOR TRANSMITTING, RECEIVING AND COLLECTING INFORMATION RELATED TO A PLURALITY OF WORKING COMPONENTS

This application claims priority from U.S. provisional application 60/210,133 filed Jun. 7, 2000 and relates to a method and system for transmitting, receiving, and collecting information related to a plurality of working components. The entire disclosure contained in U.S. provisional application No. 60/210,133, including the attachments thereto, is incorporated herein by this reference.

BACKGROUND OF THE INVENTION

For utilities, municipalities, or similar significant operational entities, operation and maintenance of working components (e.g., light fixtures, pumps, and other machinery) is a significant concern. Often, individuals or entities responsible for the operation and maintenance of such working components are responsible for a vast number of units spread over a large area. Such individuals or entities may find it necessary to, or may wish to operate and manage these working components from one or more remote locations, sending maintenance crews to the working components only as certain events occur. Indeed, operation and management from a single remote location is often the most cost-effective manner in which to operate, verify, control, and configure working components.

One of the best examples of the need for remote operation and management of working components can be found in the maintenance and operation of exterior lighting. Extensive lighting systems are found not only on city streets and highway interchanges, but also on college campuses, around commercial and industrial centers, in public and private parks and amusement centers, and any other locations where the safety of people and property is a significant concern. Exorbitant amounts of monetary and human resources are expended in operating and maintaining these lighting systems, many of which include light fixtures that are spread over large geographical areas. Generally, operations and/or maintenance personnel must be physically present to verify the proper operation and function of the fixtures. However, primarily for safety reasons, it is important to ensure that these lighting systems are operational.

In the prior art, there are various systems and methods that have been designed to remotely monitor and control lighting systems. For example, U.S. Pat. No. 6,035,266 issued to Williams et al., and assigned to A.L. Air Data, Inc. of Los Angeles, Calif., describes one such prior art system and method. U.S. Pat. No. 6,035,266 ("the '266 patent") is incorporated herein by this reference.

The '266 patent describes in detail the development of outdoor lighting systems, specifically street lamps. As such, a common mercury-vapor street lamp is described in detail with reference to FIGS. 1 and 2. Furthermore, the '266 patent recognizes that the operation and maintenance of street lamps consists of two primary tasks: monitoring and control. As such, the system and method described and claimed in the '266 patent addresses these primary tasks. Specifically, the described lamp monitoring and control system and method includes lamp monitoring and control units which are secured to each lamp in a monitored area. Each such lamp monitoring and control unit is comprised of a processing and sensing unit, a transmit (TX) unit, and a receive (RX) unit. In practice, the TX unit is used to transmit monitoring data, the RX unit is used to receive control information, and the processing and sensing unit carries out the switching or other operation of the lamp.

Signals transmitted from the lamp via the TX unit are received at a base station which includes an antenna and receiving system, along with a computing system. Signals received at the base station are passed to the computing system which processes the signals to extract data, specifically the identification of the particular lamp from which each signal was transmitted and data related to the operation and function of the particular lamp, i.e., the status of the lamp. In this regard, signal transmission is preferably accomplished through radio frequency transmissions in the range of 218–219 MHz. Furthermore, the signals have a specific data packet format consisting of a start field, an identification ("ID") field, a status field, a data field, and a stop field. The start field indicates the start of the data packet, the ID field identifies the lamp from which the data packet was transmitted, the status field indicates the status of monitoring and control unit, the data field includes any data associated with the indicated status, and the stop field indicates the end of the data packet.

Similarly, U.S. Pat. No. 6,119,076, also issued to Williams et al., and assigned to A.L. Air Data, Inc. of Los Angeles, Calif., describes a unit and method for remotely monitoring and controlling outdoor lighting systems. U.S. Pat. No. 6,119,076 ("the '076 patent") is also incorporated herein by this reference. The '076 patent describes a system very similar to that describes above with reference to the '266 patent, the primary improvement described in the '076 patent being the incorporation of a sensing element in each lamp monitoring and control unit to sense at least one lamp parameter.

Although U.S. Pat. Nos. 6,035,266 and 6,119,076 (collectively, the "A.L. Air Data Patents") generally provide for remote monitoring and control of street lamps in a lighting system, there are some significant problems in implementation. First and foremost, the preferred systems and methods of the A.L. Air Data Patents require that each lamp monitoring and control unit communicate directly with a base station, i.e., all transmitted signals must reach the base station directly. As such, signal transmission is accomplished through radio frequency transmissions in the range of 218–219 MHz. This is a licensed frequency band that is used for "Interactive Video and Data" and is thus labeled the "IVDS" band. By operating in the IVDS band, transmission of data over long distances can be accomplished. Such long-distance transmission, however, involves significant power consumption in the lamp monitoring and control units, thereby creating a significant expense.

Secondly, signals transmitted in the IVDS band may be blocked or inhibited by large objects, such as buildings. In this regard, the A.L. Air Data Patents contain no provision for alternate routing of transmitted signals when such blocking occurs.

It is thus a paramount object of the present invention to provide an improved method and system for transmitting, receiving, and collecting information related to a plurality of working components, such a street lamps, a method and system that overcomes the problems associated with prior art designs.

It is a further object of the present invention to provide a method and system for transmitting, receiving, and collecting information related to a plurality of working components that has an structure that substantially reduces the distances over which radio communications are transmitted, yet can be implemented over a large geographical area.

It is still a further object of the present invention to provide a method and system for transmitting, receiving, and collecting information related to a plurality of working components that allows for multiple and alternative paths for radio communications.

It is still a further object of the present invention to substantially eliminate the necessity of periodic and/or random physical visits to working components to verify their proper function and operation.

It is still a further object of the present invention to provide operations and maintenance personnel with the information necessary to detect and correct a problem with a working component without the necessity of multiple visits to determine the cause of a detected problem.

It is still a further object of the present invention to provide operations and maintenance personnel with the precise location of a working component that needs repair or attention.

It is still a further object of the present invention to efficiently deploy operations and maintenance personnel to address maintenance concerns associated with a plurality of working components in a prioritized manner.

It is still a further object of the present invention to provide continuous reporting of working component failure conditions.

It is still a further object of the present invention to provide for both remote and programmable command and control of working components.

It is still a further object of the present invention to provide for remote monitoring and tracking of the performance of working components to gain an improved understanding of developing trends.

These and other objects and advantages of the present invention will become apparent upon a reading of the following description.

SUMMARY OF THE INVENTION

The present invention is a method and system for transmitting, receiving, and collecting information related to a plurality of working components, such as street lamps. A preferred implementation of the method and system of the present invention is a communications network having a three-tier structure. The first tier of the communications network includes a plurality of transceiver modules, each of which is secured and operably connected to a working component, e.g., a street lamp. These transceiver modules transmit and receive radio communications or "messages" representative of the status of the working component from one another in a controlled manner, with each message ultimately being directed to an area control module. The second tier of the communications network includes a network support server at a central location, with the area control module transferring collected messages from the transceiver modules to the network support server. The network support server analyzes the information and data contained in such messages. Finally, the third tier of the communications network includes one or more control and display units, such as a personal computer with an associated Internet browser. Information and data analyzed and compiled by the network support server is transferred to the control and display units through the Internet or similar computer network for review by end users.

Furthermore, the network support server allows for control of the working components by initiating transmission of radio communications containing instructions or programming code to one or more particular transceiver modules based on a predetermined schedule, or upon occurrence of a specific event, such as a command initiated by operations and/or maintenance personnel through the control and display units.

A communications network of this nature allows for efficient and effective monitoring and control of working components through short-distance radio communications at low power levels. Importantly, transmission of messages from a particular transceiver module to the area control module, or vice versa, is accomplished through a number of intermediate transmissions through other transceiver modules. Thus, in the event a path between a particular transceiver module and the control module is not available, an alternate path can be configured between the particular transceiver module and the area control module through other transceiver modules, thereby ensuring reliable delivery of all messages to and from the area control module.

DESCRIPTION OF THE FIGURES

FIG. 12 depicts an exemplary FIXTURE MANAGER SCREEN as displayed in an Internet browser of a preferred control and display unit for the monitoring and control of street lamps in accordance with the present invention.

DESCRIPTION OF THE PRESENT INVENTION

The present invention is a method and system for transmitting, receiving, and collecting information related to a plurality of working components, such as street lamps.

Figure 1:
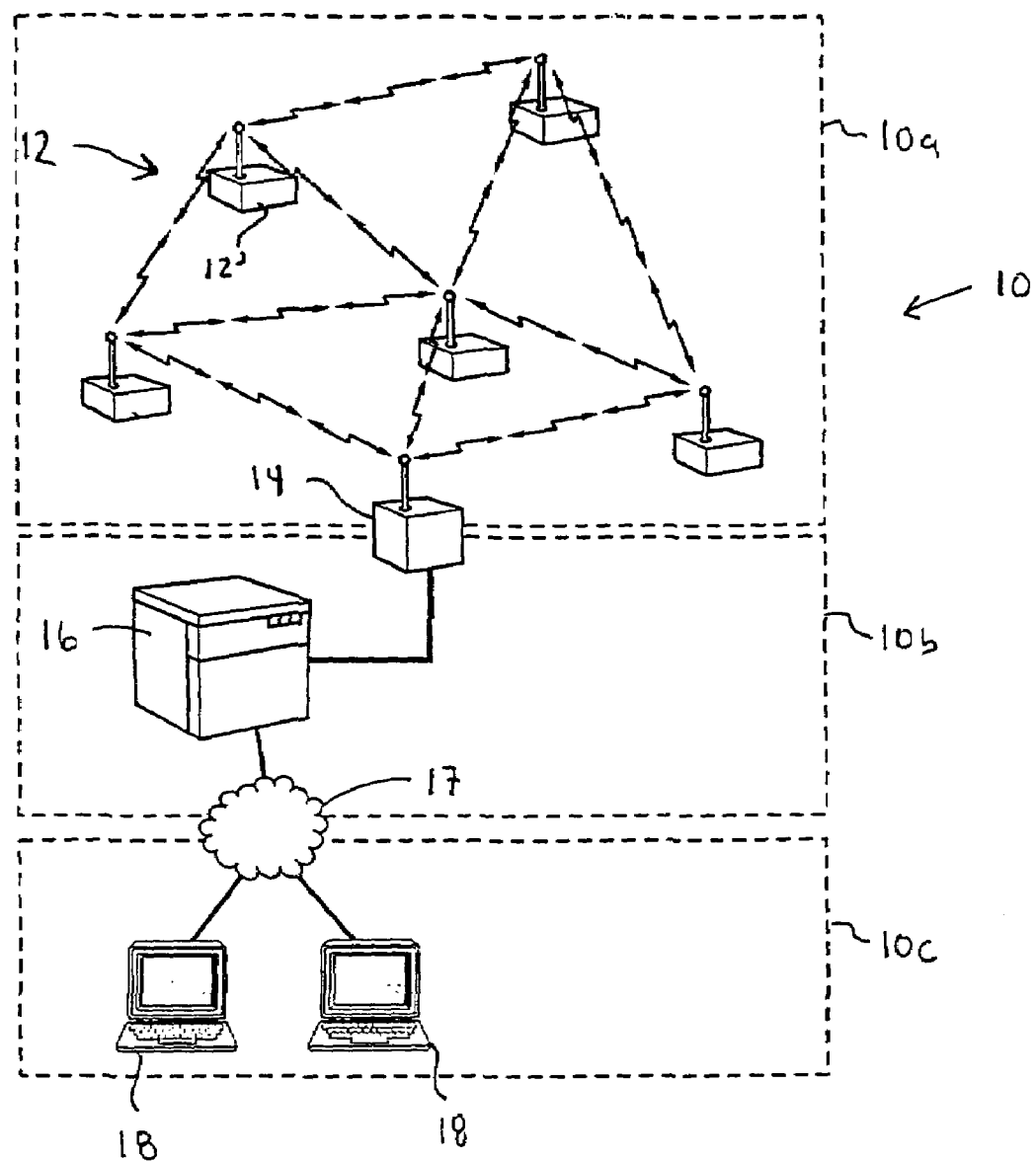
FIG. 1 is a schematic view of a preferred implementation of the method and system of the present invention—a communications network having a three-tier structure.

FIG. 1 is a schematic view of a preferred implementation of the method and system of the present invention—a communications network, generally indicated by reference numeral 10, having a three-tier structure. The first tier 10a of the communications network 10 includes a plurality of transceiver modules, generally indicated by reference numeral 12, each of which is secured and operably connected to a working component, e.g., a street lamp. For purposes of clarity in the description that follows, reference numeral 12 is used to indicate a plurality or 1 (cluster of transceiver modules that comprise a network, where reference numeral 12' indicates a specific transceiver module in a network.

These transceiver modules 12 transmit and receive messages (i.e., radio communications) from one another in a controlled manner, with each message ultimately being directed to an area control module 14. The operation and function of the transceiver modules 12 and the area control module 14 is described in further detail below.

Also, although not shown in the Figures, transceiver modules 12 that are not associated with any working component may also be incorporated into the network 10 to serve as "repeaters," bridging gaps in the network and ensuring reliable delivery of all radio communications to and from the area control module 14.

The second tier 10b of the communications network 10 includes a network support server 16. The area control module 14 serves as a bridge from the first tier 10a of the structure to the second tier 10b as it links the transceiver modules 12 to the network support server 16, transferring messages originating from the transceiver modules 12 to the network support server 16. The area control module 14 also governs the structure of the communications network 10 and controls the transmissions between the individual transceiver modules 12. The network support server 16 collects the messages from the transceiver modules 12 through the area control module 14, and analyzes the information and data contained in such messages. The network support server 16 then compiles such information and data for subsequent review and presentation to end users, such as operations and maintenance personnel. The network support server 16 further allows for control of the working components by initiating transmission of radio communications containing instructions or programming code to one or more particular transceiver modules 12 based on a predetermined schedule, or upon occurrence of a specific event, such as a command initiated by operations and/or maintenance personnel.

It is important to recognize that, although FIG. 1 shows only a single area control module 14 for monitoring and controlling a small network 10 of transceiver modules 12, in the monitor and control of a large number of working components over a vast geographical area, multiple area control modules 14 could be employed. In this regard, each area control module 14 would be connected to the network support server 16 and would service a particular cluster of transceiver modules 12.

Finally, the third tier 10c of the communications network 10 includes one or more control and display units 18, such as a personal computer with an associated Internet browser.

Information and data analyzed and compiled by the network support server 16 is transferred to the control and display units through the Internet or similar computer network 17 for review by end users. Such end users may also interact through the control and display units, controlling specific working components by issuing commands that cause the network support server 16 to transmit appropriate messages containing instructions or programming code to the transceiver modules 12 associated with the specific working components.

In general, a communications network 10 of this nature allows for efficient and effective monitoring and controlling of working components through short-distance radio communications at low power levels. Specifically, each of the transceiver modules 12 is within range of one or more other transceiver modules 12, thus forming a "line of sight" network. (Although commonly used to describe radio communications, the term "line-of-sight" is somewhat a misnomer as radio waves can pass through many materials that obstruct light waves.) In other words, a particular transceiver module 12' can communicate (i.e., send and receive radio communications) with other transceiver modules 12 within its range, the ultimate goal being to propagate messages from transceiver module to transceiver module until they can be received at an area control module 14, which may be termed a "network access point." In this regard, each and every transceiver module 12' is aware of all its immediate neighbors and the most efficient path to the area control module 14; thus, if a transceiver module 12' receives a message from a neighbor, it is preprogrammed to make a determination of whether it lies in the most efficient path and thus whether or not to repeat/re-transmit the message.

Through this method of communication, only low-powered and short-distance radio communications are necessary to transmit messages from a source to a destination, i.e., from the individual transceiver modules 12 to an area control module 14, or vice versa. Once messages from the transceiver modules 12 reach the area control module 14, the messages can be forwarded to the network support server 16 for subsequent analysis and display, as described above. Similarly, messages may be transmitted from the network support server 16 to the area control module 14 and through intermediate transceiver modules 12 to one or more specific transceiver modules 12.

Figure 2:
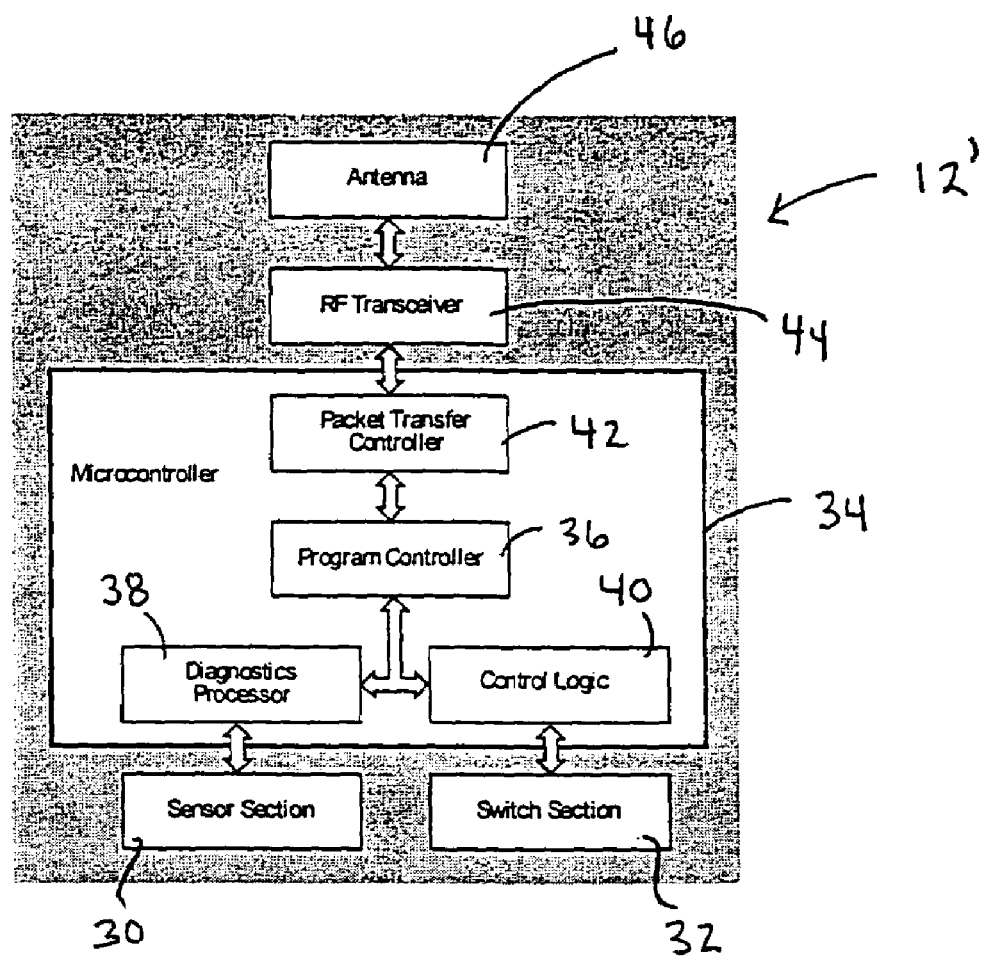
FIG. 2 is a functional block diagram of a preferred transceiver module in the preferred implementation of the method and system of FIG. 1.

FIG. 2 is a functional block diagram of a preferred transceiver module 12' in accordance with the method and system of the present invention. As mentioned above, a transceiver module 12' is secured and operably connected to a working component, thereby serving as a node in the communications network 10 depicted in FIG. 1. As shown in FIG. 2, in this preferred embodiment, each transceiver module 12' includes one or more sensors 30 for sensing various parameters of the working component to which it is secured. When the method and system of the present invention is implemented to monitor street lamps or similar light fixtures, a preferred sensor 30 might measure current flow or voltage, or count the total number of hours that the bulb was burning, or count the number of bulb strikes. Each transceiver module 12' also includes a switch component 32 for operational control of the working component. For example, in the control of street lamps or similar light fixtures, the switch component 32 would be used to turn a lamp on and off.

The sensors 30 and the switch component 32 are operably connected to a microcontroller, generally indicated by reference numeral 34. The microcontroller 34 controls all operation and function of the transceiver module 12'. In this regard, the microcontroller 34 is comprised of four primary sub-components for coordinating and carrying out the operation and function of the transceiver module 12': (1) a program controller 36; (2) a diagnostics processor 38, (3) a control logic 40; and (4) a packet transfer controller 42. In this preferred embodiment, the microcontroller 34 is manufactured and distributed by Philips Semiconductors of Sunnyvale, Calif., namely Model No. P89C668. This particular microcontroller 34 has a non-volatile 64-KB programmable memory and volatile random-access memory (RAM). This microcontroller 34 further includes multiple input/output ports and clock/timer/event counters (which allow for time-sensitive functionality, such as message holding, time-based pattern recognition, and various diagnostic and polling operations).

Returning to the primary sub-components of the microcontroller 34, the program controller 36 is the nerve center of the microcontroller 34, executing embedded software code to coordinate and control all function and operation of he transceiver module 12', and acting as the intermediary between the other functional and operational sub-components of the microcontroller 34. For example, the program controller 36 can be programmed to initiate radio communications, specifically the transmission of messages containing the identification, location, and status of the working component, on a predetermined schedule or upon occurrence of a specific event. The program controller 36 can also be programmed to execute a control instruction (e.g., to turn the working component on or off), initiate diagnostic testing, or perform other activities based in response to the receipt of incoming messages.

Of course, to carry out the execution of such routines and subroutines, it is understood that standard programming languages and techniques would be used. With benefit of the foregoing description, such programming is readily accomplished by one of ordinary skill in the art.

The embedded software code is stored and maintained in the non-volatile memory of the microcontroller 34, along with a unique identification code for the transceiver module 12'. Stored in the volatile memory is transient information and data communicated to the program controller 36 through other functional and operational sub-components of the microcontroller 34, as will be further described below. Lastly, although not essential to the present invention, in some embodiments of the present invention, it is contemplated that the memory of the microcontroller 34 would also store and maintain other relevant information, such as the location of the working components (e.g., GPS coordinates), a secure owner access code, the date that the transceiver module was installed, the date that the working component was installed, and other information or data associated with the working component and relevant to the maintenance and operation of the working component.

The diagnostics processor 38 is operably connected to and receives signals from the one or more sensors 30 described above and serves as an intermediary between the sensors 30 and the program controller 36. The diagnostics processor 38 is programmed to interpret and recognize failure patterns or other problems associated with the operation of the working component based on signals from the one or more sensors 30. Specifically, signals from the sensors 30 (which are indicative of the condition or status of various functional or operational parameters of the working component to which the transceiver module 12' is secured) are passed the diagnostics processor 38, examined and interpreted, and then passed to the program controller 36. Of course, the sensors 30 and generated signals are specific to the working component to which the transceiver module 12' is secured.

The control logic 40 is operably connected to the switch component 32 and/or any other similar external actuators and serves as an intermediary between the switch component 32 or any other external actuators and the program controller 36. The control logic 40 is programmable to react in response to a particular condition or event reported by the diagnostics processor 38, or in response to a specific incoming message received through the RF transceiver 44 associated with the transceiver module 12', which will be further described below.

The fourth and final sub-component of the microcontroller 34 is the packet transfer controller 42, which controls the propagation of incoming messages received through the RF transceiver 44, along with transmission of outgoing messages. The RF transceiver 44 is a wireless radio transceiver with an associated antenna 46 that is capable of sending and/or receiving a radio communication containing information and data about the identity and status of a working component. The RF transceiver 44 is capable of receiving radio communications from not only an area control module 14 (as described above with reference to FIG. 1), but also from other neighboring transceiver modules 12 within its range, the importance of which will become clearer below. It is contemplated and preferred that the RF transceiver 44 associated with each transceiver module 12' will operate in the unlicensed radio spectrum, such as: (1) the 902 MHz to 928 MHz frequency band, or (2) the 2.40 GHz to 2.48 GHz frequency band. These unlicensed frequency bands are designed for "Industrial, Scientific and Medical" use, and are thus labeled "ISM" bands. Furthermore, since the RF transceivers 44 associated with each transceiver module 12' are to be operated at very low power levels, e.g., 10 mW to 500 mW, the RF transceivers 44 can operate after being certified by local communication regulations, and no further governmental license or usage fees are required. Of course, a shortcoming of such low-powered RF transceivers 44 is their limited range, i.e., the transceivers 44 can only transmit and receive radio communications over distances of five to 1000 feet; however, this limitation is overcome by the network structure of the present invention.

In this preferred embodiment, the RF transceiver 44 is manufactured and distributed by RF Micro Devices, Inc. of Greensboro, N.C., namely Model No. RF2905. This particular RF transceiver 44 is low-powered transceiver designed to operate in the 902 MHz to 928 MHz ISM frequency band. Additionally, it is preferred that the transceiver 44 use Frequency Shift Keying (FSK) as its digital modulation format. In this regard, to synchronize a receiving clock with a transmitter clock, the Manchester encoding/decoding technique is preferably implemented in embedded software.

Returning to the fourth and final sub-component of the microcontroller 34, the packet transfer controller 42 determines what happens to an incoming radio communication. Specifically, for any incoming radio communication ("message"), there are four options: (1) repeat/re-transmit the message if the message is being transmitted along a designated path to or from an area control module 14, as will be further described below; (2) discard the message if the message is not being transmitted along a designated path to or from an area control module 14; (3) pass the message through to the program controller 36 if the particular receiving transceiver module 12' is the intended destination of the message; or (4) hold the message if the message is being transmitted along a designated path to or from an area control module 14, but the RF transceiver 44 is currently not available to repeat/re-transmit the message.

With respect to "holding" a message, it should be understood that the RF transceiver 44 can either transmit a message or receive a message, but can not generally perform both functions simultaneously. Furthermore, if one of the RF transceivers 44 associated with a transceiver module 12' in a specific network is transmitting, it is preferred that all neighboring transceiver modules 12 within its range remain silent so as to avoid interference among transmissions. Therefore, if the packet transfer controller 42 has received a message, determined it is to repeat/re-transmit the message, but has been ordered to remain silent, it holds the message in a buffer (volatile memory) until it has permission to transmit again.

Furthermore, assuming that a particular incoming radio communication needs to be transmitted to multiple transceiver modules 12, it is possible that the radio communication will be both repeated/re-transmitted and passed the message through to the program controller.

Of course, the packet transfer controller 42 also controls the transmission of outgoing radio communications initiated by the program controller 36.

As described above, a preferred transceiver module 12' in accordance with the method and system of the present invention thus serves as an node in the communications network 10 depicted in FIG. 1, monitoring and controlling the working component to which it is secured. Sensors 30 associated with the transceiver module 12' sense or measure various parameters of the working component, communicating such diagnostic assessments, measurements and status indications to the program controller 36 through the control logic 40. Based on such measurements or status indications, the program controller 36 can (1) operate switches 32 or other external actuators to control the function of the working component; (2) transmit a message containing information and data associated with the measurements or status indications through the packet transfer controller 42 and the RF transceiver 44 and associated antenna 46; or (3) do nothing. Also, based on messages received through the RF transceiver 44 that are communicated to the program controller 36 through the packet transfer controller 42, the program controller 36 can operate switches 32 or other external actuators to control the function of the working component. Finally, the transceiver module 12' can function simply as a relay station, repeating and re-transmitting messages received from neighboring transceiver modules 12.

It is important to recognize that since such a transceiver module 12' needs to be secured to each working component in a network or area to be monitored, it is important that assembly costs and expenses be minimized. In other words, for purposes of reducing equipment and implementation costs, resource requirements should be minimized where a large number of units is required. Specifically, it is important to minimize the costs of the transceiver modules 12 since such a transceiver module 12 must be secured to each and every working component in the network. In this regard, as should be clear from the foregoing description, the microcontroller 34 associated with each transceiver module 12' has only limited memory capacity and requires minimal power consumption. All information and data is stored in volatile memory until successful transmission, thereby minimizing the necessary storage requirements. And, because of the short-distance radio communications, only minimal power is consumed. Resources are then concentrated in the area control modules 14 and the network support server (i.e. the second tier 10b of the network 10 depicted in FIG. 1), which are discussed in further detail below.

Figure 3:
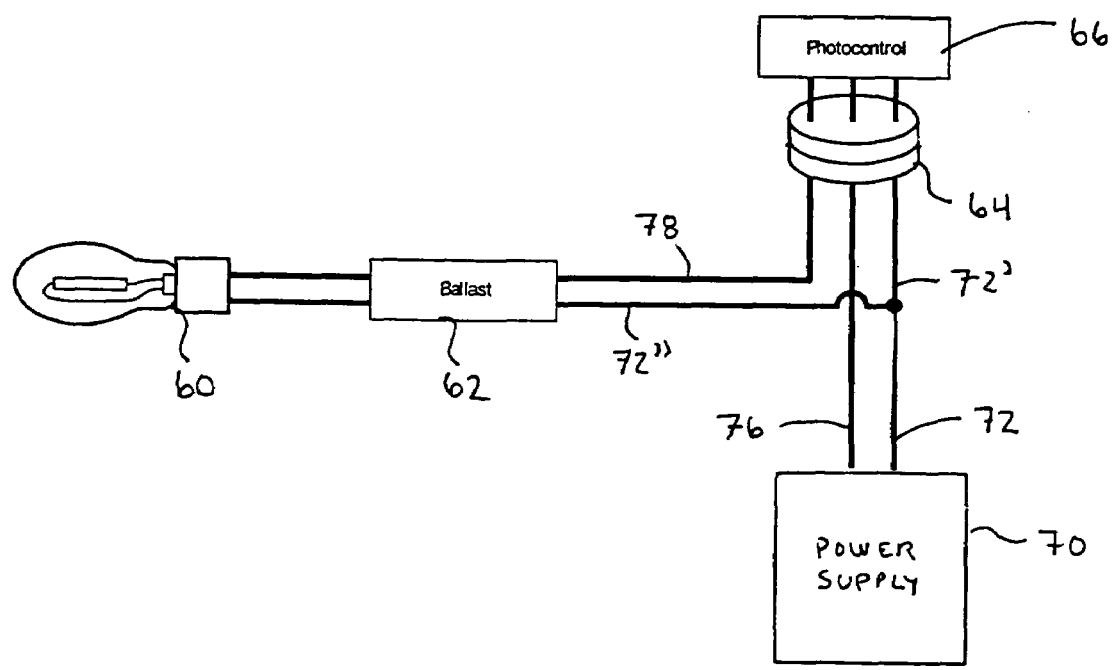
FIG. 3 depicts a standard street lamp or similar light fixture.

FIG. 3 depicts a standard street lamp or similar light fixture 60 with an associated ballast 62. The street lamp 60 is powered by a high-voltage AC current, a photocontrol socket 64 being operably connected to a high-voltage AC power supply 70. Specifically, there is neutral line 72 and a hot line 76 from the AC power supply 70. One branch of the neutral line 72' extends between the AC power supply 70 and the photocontrol socket 64, and a second branch of the neutral line 72" extends between the AC power supply 70 and the lamp 60 and associated ballast. The hot line 76 extends between the AC power supply 70 and the photocontrol socket 64, and there is a switched hot line 78 between the photocontrol socket 64 and the lamp 60 and associated ballast 62. Seated in the photocontrol socket 64 is a photocontroller 66 which effectively turns the street lamp 60 on and off in response to light through energizing or de-energizing the switched hot line 78.

Figure 4:
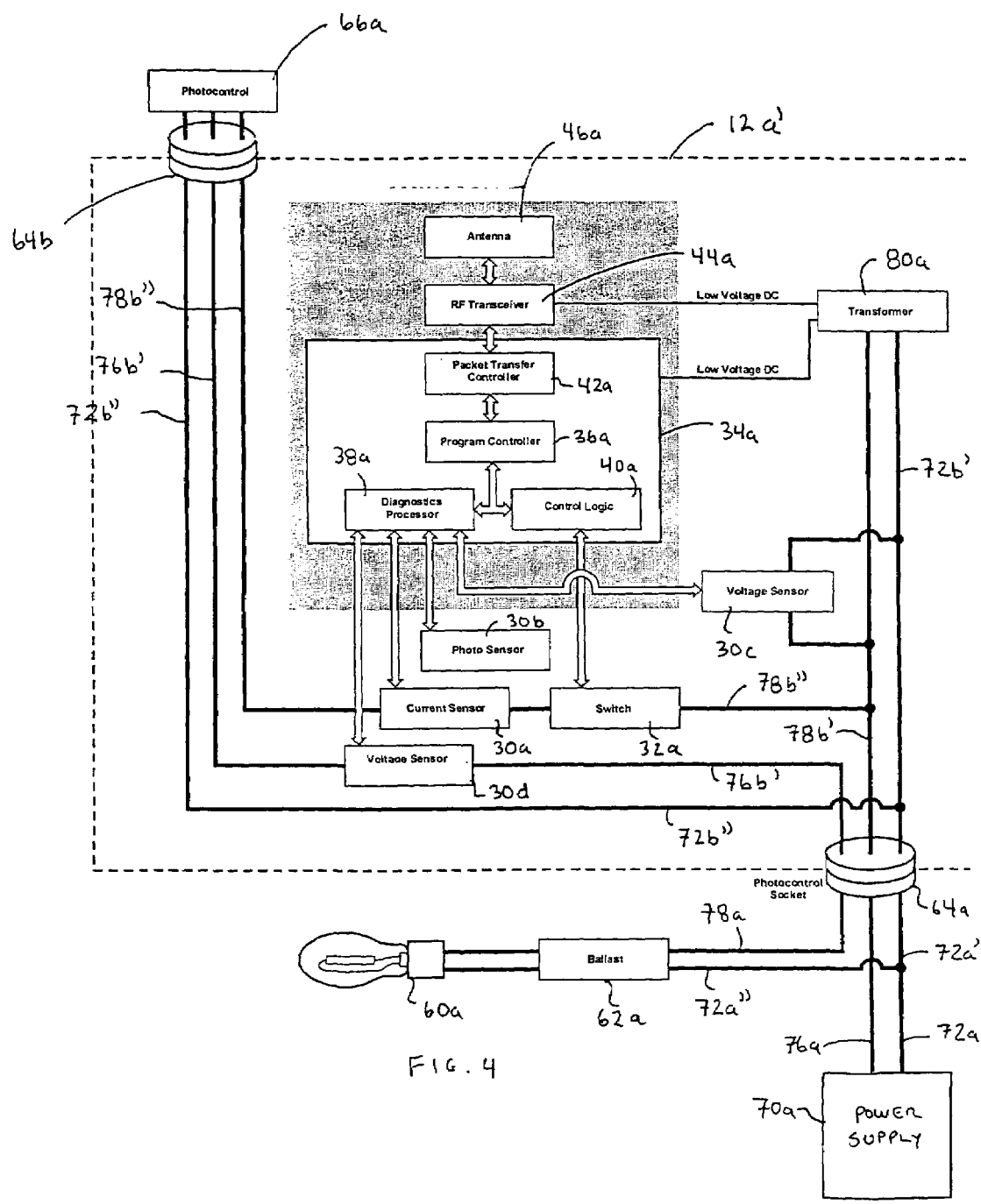
FIG. 4 is a functional block diagram of a preferred transceiver module in the preferred implementation of the method and system of FIG. 1, in which said transceiver module used for the monitoring and control of a street lamp or similar light fixture.

FIG. 4 is a functional block diagram of a preferred transceiver module 12a' in accordance with the method and system of the present invention, wherein said transceiver module 12a' is implemented for the monitoring and control of a street lamp 60a, similar to that depicted in FIG. 3. As shown in FIG. 4, the transceiver module 12a' is interposed between the photocontrol socket 64a and the seated photocontroller 66a. In this manner, the transceiver module 12a' of the present invention can be incorporated into existing street lamps without impacting or interfering with the operation and function of existing photocontrollers. Moreover, as further described below, in this configuration, the transceiver module 12a' can diagnose proper operation of the photocontroller 66a.

Again, in this preferred embodiment, the transceiver module 12a' is designed for the monitoring and control of a street lamp 60a and thus includes: (1) a current sensor 30a; (2) a photo sensor 30b; (3) a first voltage sensor 30c; and (4) a second voltage sensor 30d, each of which will be further described below. The use of these sensors allows for a determination and measurement of data such as: total hours burning since installation; number of strikes since installation; total hours ballast running since installation; current line voltage measurement; average line voltage; minimum line voltage; cycling of the lamp; and maximum line voltage.

The preferred transceiver module 12a' also includes a switch component 32a for operational control of the lamp 60a.

As with the transceiver module 12' described above with reference to FIG. 2, the sensors 30a-d and the switch component 32a of the preferred transceiver module 12a' for street lamp monitoring and control are operably connected to a microcontroller 34a. The microcontroller 34a controls all operation and function of the transceiver module 12a' and is comprised of four primary sub-components for carrying out the operation and function of the transceiver module 12a': (1) a program controller 36a; (2) a diagnostics processor 38a, (3) a control logic 40a; and (4) a packet transfer controller 42a. The operation and function of each of these sub-components was described above with reference to FIG. 2, and this preferred transceiver module 12a' thus serves as an node in the communications network linking a plurality of street lamps for centralized monitoring and control.

Again, the street lamp 60a is powered by a high-voltage AC current, and, as with the street lamp of FIG. 3, there is neutral line 72a and a hot line 76a from an AC power supply 70a. One branch of the neutral line 72a' extends between the AC power supply 70a and the photocontrol socket 64a, and a second branch of the neutral line 72a" extends between the AC power supply 70a and the lamp 60a and associated ballast 62a. The hot line 76a extends between the AC power supply 70a and the photocontrol socket 64a, and there is a switched hot line 78a between the photocontrol socket 64a and the lamp 60a and associated ballast 62a.

With the transceiver module 12a' interposed between the photocontrol socket 64a and the seated photocontroller 66a, the transceiver module 14 is operably connected to the neutral line 72a, the hot line 76a, and the switched hot line 78a.

First, a first branch of the neutral line 72b' and a first branch of the switched hot line 78b' extend from the photocontrol socket 64a to a transformer 80a. This transformer 80a outputs a low voltage current for supplying power to the microcontroller 34a and RF transceiver 44a. Furthermore, a voltage sensor 30c is operably connected to the first branch of the neutral line 72b' and the first branch of the switched hot line 78b' to measure the voltage between the photocontrol socket 64a and the transformer 80a, data that is communicated to the diagnostics processor 38a and subsequently passed to the program controller 36a.

Secondly, a second branch of the neutral line 72b" and a second branch of the switched hot line 78b" extend from the photocontrol socket 64a to the photocontroller 66a. In this regard, as indicated in FIG. 4, since the transceiver module 12a' of the present invention is adapted to be received by and operably connected to the photocontrol socket 64a of a standard street lamp 60a, the transceiver module 12a' itself includes a second, analogous photocontrol socket 64b for receiving the photocontroller 66a. In its path to the second photocontrol socket 64b, the second branch of the switched hot line 78a" passes through the switch 32a, which is operably connected and controlled by the control logic 40a of the microcontroller 34a; and through the current sensor 30a, the current measurement data being communicated to the diagnostics processor 38a and subsequently passed to the program controller 36a.

Thirdly, the sole branch of the hot line 76b' extends from the photocontrol socket 64a to second photocontrol socket 64b. In its path to the second photocontrol socket 64b, this branch of the hot line 76a' passes through the second voltage sensor 30d, which measures the voltage between the photocontrol socket 64a and the second photocontrol socket 64b, the voltage measurement data being communicated to the diagnostics processor 38a and subsequently passed to the program controller 36a. Specifically, such voltage measurement data, in conjunction with clock information from the microcontroller 34a, provides confirmation of the proper operation of the photocontroller 66.

As described above with reference to FIG. 2, each transceiver module 12a' has only limited memory capacity and requires minimal power consumption. Specifically, all information and data is stored in volatile memory until successful transmission, thereby minimizing the necessary storage requirements. And, because of the short-distance radio communications, only minimal power is consumed.

Figure 5:
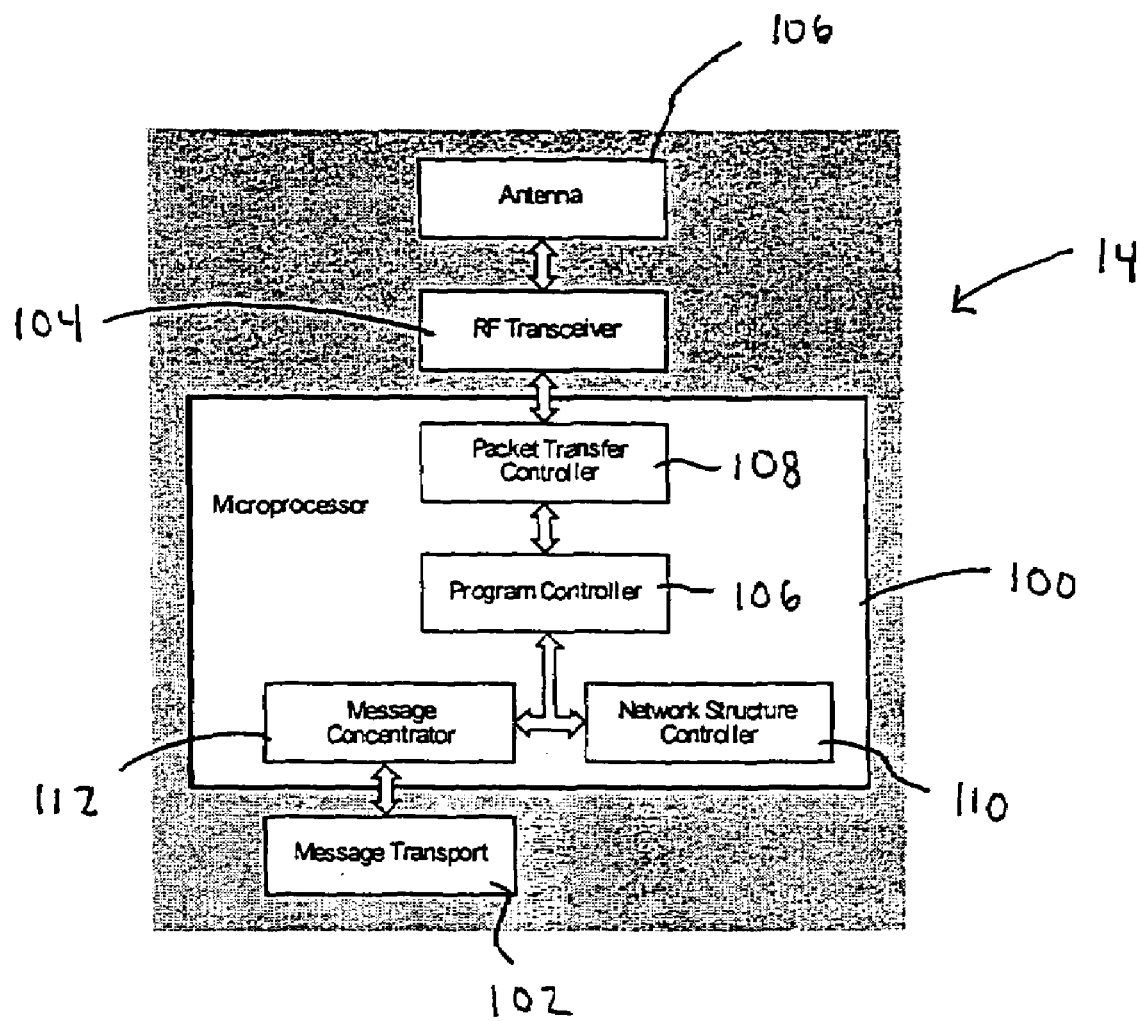
FIG. 5 is a functional block diagram of a preferred area control module in the preferred implementation of the method and system of FIG. 1.

FIG. 5 is a functional block diagram of a preferred area control module 14 in accordance with the method and system of the present invention.

The area control module 14 acts as a "network access point" for a network 10 of transceiver modules 12, as depicted in FIG. 1. As mentioned above, each of the transceiver modules 12 can communicate (i.e., send and receive radio communications) with other transceiver modules 12 within its area, the ultimate goal being to propagate messages from transceiver module to transceiver module until they can be received at an area control module 14. Of course, messages can also be transferred from a control 14 module to a specific transceiver module 12' through the network as well. In either event, the area control module 14 exchanges messages between the transceiver modules 12 and the network support server 16.

Most importantly, the area control module 14 organizes and maintains the structure and relationship of individual transceiver modules 12 with respect to one another in the defined communications network 10. Specifically, through periodic polling of all transceiver modules 12 in the territory of the area control module 14, the area control module 14 examines the proper operation (response) of the transceiver modules 12 by monitoring the paths through which messages from specific transceiver modules 12 are being received. Thus, if a new transceiver module 12' is added to the network 10, or removed from the network 10, the area control module 14 can re-calculate the most efficient paths for messages to and from each transceiver module 12', and then transmit an appropriate message to the transceiver modules 12 defining the "designated paths" for messages it may receive from neighboring transceiver modules 12. The packet transfer controllers 40 associated with each transceiver module 12 then know which messages to discard and which messages to repeat/re-transmit.

Of course, as mentioned above, FIG. 1 shows only a single area control module 14 for monitoring and controlling a small network 10 of transceiver modules 12. However, it should be clear that for monitoring and control of a large number of working components over a vast geographical area, multiple area control modules 14 could be employed, each area control module 14 being connected to the network support server 16 and servicing a particular cluster of transceiver modules 12. In this regard, in this preferred embodiment, it is contemplated and preferred that each area control module 12 would monitor and control between 50 and 250 transceiver modules 12.

Returning to FIG. 5, a preferred area control module 14 in accordance with the present invention includes: (1) a microprocessor 100; (2) a message transport 102; and (3) an RF transceiver 104 and associated antenna 106.

The microprocessor 100 coordinates and controls all operation and function of the area control module 14. As such, in this preferred embodiment, the microprocessor 100 is a single board, diskless embedded computer based on the Intel x86 instruction set and architecture. This microprocessor 100 preferably runs Windows CE(g, a real-time, 32-bit, embedded operating system with built-in communication capabilities distributed by the Microsoft Corporation of Redmond, Wash.

The microprocessor 100 is comprised of four primary sub-components for carrying out the operation and function of the area control module 14: (1) a program controller 106; (2) a packet transfer controller 108, (3) a network structure controller 110; and (4) a message concentrator 112.

Returning to the primary sub-components of the microprocessor 100, the program controller 106 executes embedded software code to coordinate and control all function and operation of the area control module 14 and acting as the intermediary between the other functional and operational sub-components of the microprocessor 100. For example, the program controller 106 can be programmed to initiate radio communications, specifically the transmission of messages to request the status of one or more working components, on a predetermined scheduled or upon occurrence of a specific event, such as a command from the network support server 16. The program controller 106 can also be programmed to initiate diagnostic testing or other operational activities.

Of course, to carry out the execution of such routines and subroutines, it is understood that standard programming languages and techniques would be used. With benefit of the foregoing description, such programming is readily accomplished by one of ordinary skill in the art.

The embedded software code is stored and maintained in the non-volatile memory of the microprocessor 100, whereas transient information and data communicated from the transceiver modules 12 for subsequent transmission to the network support server 16 (as depicted in FIG. 1) is stored in volatile memory. Lastly, it is contemplated and preferred that the microprocessor 100 of the area control module 14 include a memory component for storing such information as: the location of the area control module (e.g., GPS coordinates), a secure owner access code, the date that the area control module was installed, and other information or data associated with the area control module.

The packet transfer controller 108 passes all incoming messages from the transceiver modules 12 (as received through the RF transceiver 104 and associated antenna 106) to the program controller 106, and, for outgoing messages either (1) sends the message; or (2) holds the message. Specifically, the RF transceiver 104 can either transmit a message or receive a message, but can not generally perform both functions simultaneously. Therefore, if the packet transfer controller 102 is currently in a receiving mode, it holds the outgoing message in a buffer (volatile memory) until it has permission to transmit.

As for the RF transceiver 104 and associated antenna 106, as with the transceiver module 12' described above with reference to FIG. 2, the preferred RF transceiver 104 is a wireless radio transceiver that is capable of receiving a radio communication containing information and data about the identity and status of a working component, and further capable of sending a radio communication for controlling a particular working component. It is contemplated and preferred that the RF transceiver 104 associated with the area control module 14 will operate in the unlicensed radio spectrum, such as: (1) the 902 MHz to 928 MHz frequency band, or (2) the 2.40 GHz to 2.48 GHz frequency band. In this preferred embodiment, the RF transceiver 104 is manufactured and distributed by RF Micro Devices, Inc. of Greensboro, N.C., namely Model No. RF2905. This particular RF transceiver 104 is low-powered transceiver designed to operate in the 902 MHz to 928 MHz ISM frequency band. Additionally, it is preferred that the transceiver 44 use Frequency Shift Keying (FSK) as its digital modulation format. In this regard, to synchronize a receiving clock with a transmitter clock, the Manchester encoding/decoding technique is preferably implemented in embedded software.

The network structure controller 110 is the sub-component of the microprocessor 100 that organizes and maintains the structure and relationship of individual transceiver modules 12 with respect to one another in order to form the communications network 10 (as depicted in FIG. 1). Specifically, the network structure controller 110 performs any necessary re-configuration of the designated communications paths in the network 10, and further maintains a databank containing the information as to how to communicate with each transceiver module 12 in the network 10 (as depicted in FIG. 1). In other words, for each transceiver module 12' in the network 10, the network structure controller 110 defines and maintains the designated path for propagation of radio communications through other transceiver modules 12 and to the area control module 14, and vice versa This is accomplished through a periodic polling of all transceiver modules 12 in the area of the area control module 14, examining the availability of and current configuration of the transceiver modules 12. If one or more particular transceiver modules 12 are not available, the network structure controller 110 determines an alternate path for communication. In this regard, the preferred path is generally the path that requires the fewest number of intermediate transmissions through other transceiver modules 12. Any such reconfiguration of the designated paths is stored in the databank associated with the network structure controller 110. The definition of the designated paths is further communicated to the affected transceiver modules 12 themselves so that the respective packet transfer controllers 42 of the transceiver modules 12 can accurately determine whether to (1) repeat/re-transmit a message; (2) discard a message; (3) pass the message through to the program controller.

Furthermore, if a new transceiver module 12' is added to the cluster, it will start signaling its presence. Because the signal is identified as "new," it is propagated throughout the cluster of transceiver modules 12 until it reaches the area control module 14. As part of the propagation, a count of the intermediate transmissions from one transceiver module 12 to another is established, along with the relationship of the new transceiver module 12' to its neighbors. The network structure controller 110 of the microprocessor 100 recognizes the new transceiver module 12' and based on an analysis of the count of intermediate transmissions and the relationship of the new transceiver module 12' to its neighbors, the preferred or designated path is determined for the new transceiver module 12', generally the path that requires the fewest number of intermediate transmissions through other transceiver modules 12. The definition of this new designated path is further communicated to the transceiver module 12' and other affected transceiver modules 12, and signals from the transceiver module 12' are no longer designated as "new."

The final sub-component of the microprocessor 100 is the message concentrator 112. The message concentrator 112 serves to ensure efficient and secure transfer of information and data from the area control module 14 to the network support server 16 (as depicted in FIG. 1) through the above-mentioned message transport 102. In this regard, the message transport 102 is typically an interface to a commercial, publicly available computer or communications network, such as the Internet. However, other methods of communication could also be used with departing from the spirit and scope of the present invention. Specifically, the message concentrator 112 collects incoming messages in an associated buffer, stringing messages together prior to transfer. In this manner, a few long messages can be transferred to the network support server 16, rather than multiple short messages. At the same time, it is contemplated and preferred that the messages be encoded according to an encryption scheme. In this regard, it is further contemplated and preferred that the message concentrator 112 decodes messages coming from the network support server 16 (as depicted in FIG. 1).

In summary, the program controller 106 of the microprocessor 100 executes embedded software code (stored and maintained in the non-volatile memory) to coordinate and control all function and operation of the area control module 14 and can be programmed to initiate diagnostic testing or radio communications, specifically the transmission of messages to request the status of one or more working components, on a predetermined scheduled or upon occurrence of a specific event. The packet transfer controller 108 of the microprocessor 100 passes all incoming messages from the transceiver modules 12 (as received through the RF transceiver 104 and associated antenna 106) to the program controller 106, and also transmits outgoing messages. The network structure controller 110 of the microprocessor 100 organizes and maintains the structure and relationship of individual transceiver modules 12 with respect to one another, and further performs any necessary re-configuration of the designated communications paths. Lastly, the message concentrator 112 of the microprocessor 100 ensures efficient and secure transfer of information and data from the area control module 14 to the network support server 16 (as depicted in FIG. 1) through the message transport 102.

Thus, the area control module 14 in the implementation of the method and system of the present invention described herein provides the integral communications link between the individual transceiver modules 12 and the network support server 16.

Figure 6:
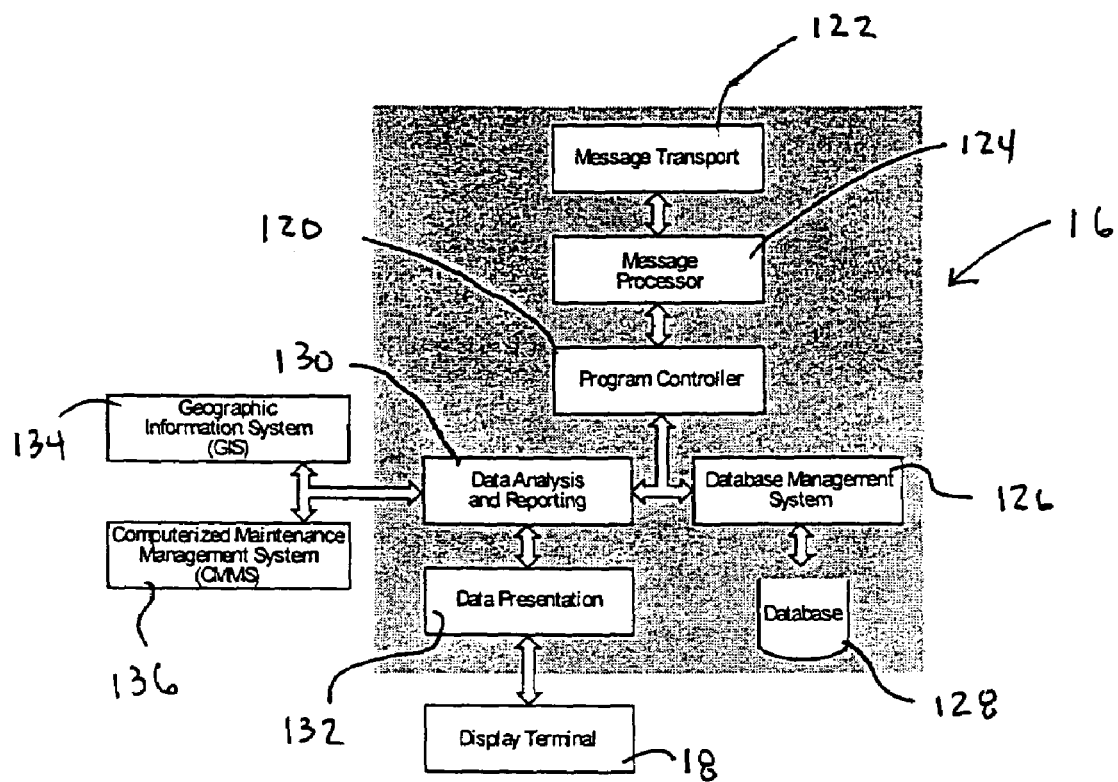
FIG. 6 is a functional block diagram of a preferred network support server in the preferred implementation of the method and system of FIG. 1.

FIG. 6 is a functional block diagram of a preferred network support server 16 in accordance with the method and system of the present invention. As mentioned above with respect to FIG. 1, the network support server 16 collects the messages from the transceiver modules 12 through one or more area control modules 14, and analyzes the information and data contained in such messages. The network support server 16 then compiles such information and data for subsequent review and presentation to end users, such as operations and maintenance personnel.

In this regard, the network support server 16 is preferably a standard computer server with a Linux® or similar high-performance operating system that executes database management and information service applications. In other words, the network support server 16 performs the requisite back-end tasks, centralizing storage of information and data, facilitating retrieval of such information and data, and responding to requests and commands from end users through the control and display units 18, as described above.

The network support server 16 comprises six primary sub-components for carrying out its operation and function: (1) a program controller 120; (2) a message transport 122, (3) a message processor 124; (4) a database management system 126; (5) a data analysis and reporting component 130; and (6) a data presentation interface 132.

The program controller 120 executes application software code (stored in the memory of the network support server 16) to control all function and operation of the network support server 16 and acts as the intermediary between the other functional and operational sub-components of the network support server 16.

The message transport 122 cooperates and communicates with the message transport 102 associated with the area control module 14, as described above with reference to FIG. 5. Specifically, the message transport 122 is typically an interface to a commercial, publicly available computer or communications network, such as the Internet, that allows for secure transmission of messages from one or more area control modules 14 to the network server 16.

The message processor 124 decomposes messages from the one or more area control modules 14 as received through the message transport 122, and further prepares messages to be communicated from the network support server 16 to the area control modules 14 through the message transport 122.

The database management system 126 and associated database 128 provides for the storage and maintenance of all information and data received from the transceiver modules 12 through the one or more area control modules 14. It is important to note that the architecture and design of this database 128 is not essential to the method and system of the present invention provided that the database can meet the necessary storage and retrieval requirements. Various commercial software packages and/or programming techniques could be used by those skilled in the art to develop this database without departing from the spirit and scope of the present invention.

Of further note, as mentioned above, through central storage and maintenance of collected information and data, only minimal memory storage is required for the transceiver modules 12 and area control modules 14, thereby significantly reducing the costs of the transceiver modules 12 and area control modules 14.

The data analysis and reporting component 130 of the network support server 16 is comprised of software applications that allow for more detailed analysis of information and data. In the preferred embodiment depicted in FIG. 6, the data analysis and reporting component 130 in integrally and operably connected to a Geographic Information System ("GIS") and a Computerized Maintenance Management System ("CMMS").

A GIS is a visualization tool used for topographic analysis, development planning, and decision modeling. A GIS displays spatial relationships, correlated to geographically referenced features, such as roads, buildings, rivers, and jurisdictional boundaries. In other words, a GIS allows for the generation of dynamic, high-quality maps for the exploration of the interaction between places, people, and objects. By integrating a GIS with the method and system of the present invention, operations and maintenance personnel are provided with visual information that allows for more effective administration of working components. For example, with respect to the operation and maintenance of a network of street lamps, operations and maintenance personnel will have access to dynamic maps that show the location of the street lamps relative to one another and to geographically referenced features. This allows for route optimization (for maintenance personnel) and minimizes the time spent finding one or more working components.

A CMMS is commonly used manage the complex mix of resources (i.e., personnel, time, and capital) needed to minimize disruptions caused by failures of working components. A CMMS facilitates good maintenance practices with an emphasis on proactive work planning and root cause analysis. With a CMMS, maintenance activities are managed as an integrated, essential part of ongoing operations, and the system becomes a source of measurements and metrics for continuous improvement programs. By integrating a CMMS with the method and system of the present invention, further efficiencies are realized. Specifically, the diagnostics information collected through the method and system of the present invention broadens the capabilities of the CMMS through continuous condition monitoring. Such continuous condition monitoring allows for the detection of operating characteristics that commonly precede failure of a working component. For example, if cycling is detected in a street lamp through the method and system of the present invention, the street lamp can be automatically shut down, and the CMMS can be programmed to immediately generate a work order. Since cycling is intercepted before it causes damage to the internal components of the street lamp, the life of the street lamp is prolonged.

Finally, the data presentation interface 132 allows for review and presentation of the collected information and data to end users, such as operations and maintenance personnel. Specifically, it is preferred that the data presentation interface 132 facilitate transfer of the collected information and data to a computer network, such as the Internet, such that end users can review the collected information and data through a control and display unit 18, such as a personal computer with an associated Internet browser, as described above with reference to FIG. 1.

Figure 10:
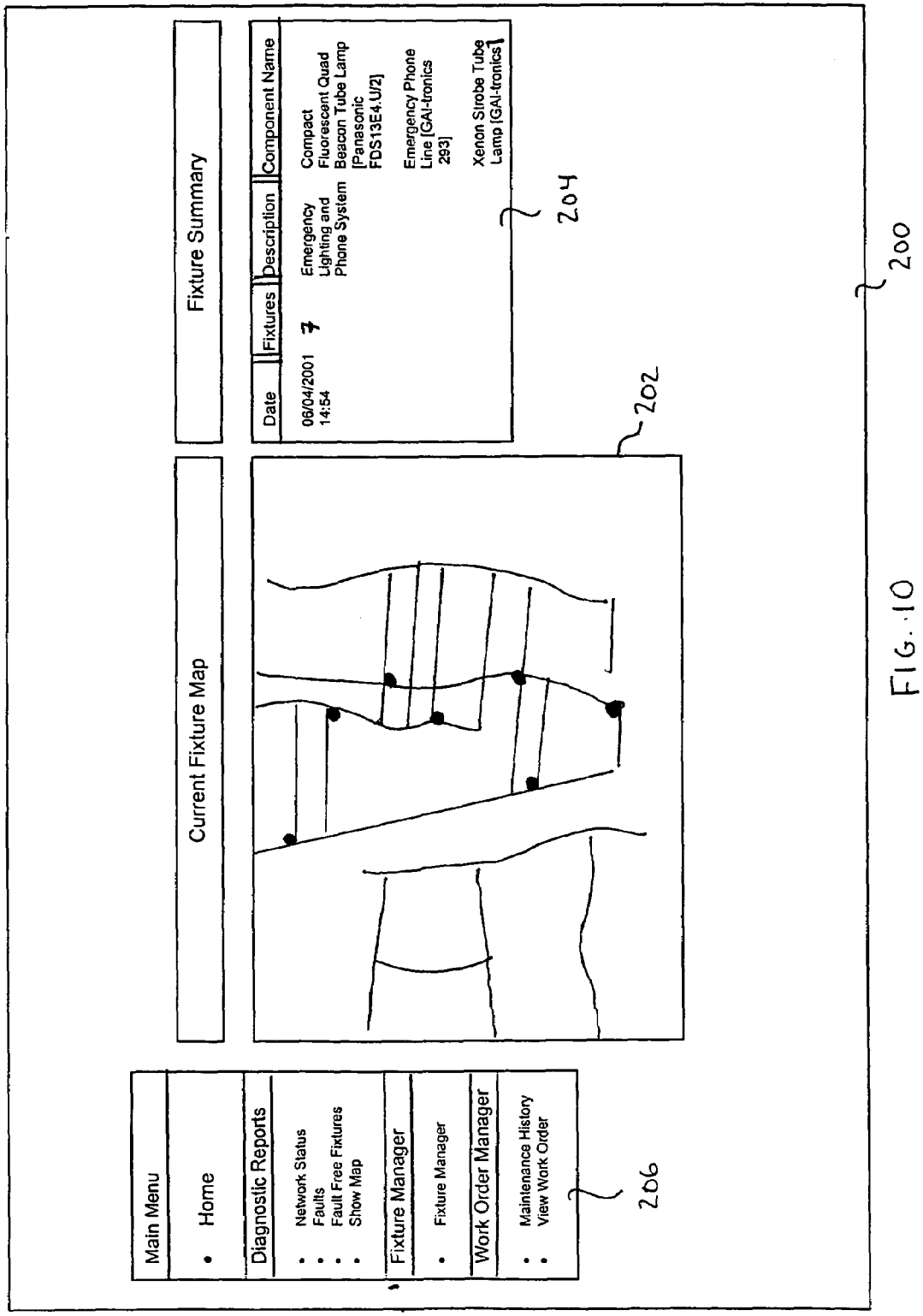
FIG. 10 depicts an exemplary HOME SCREEN, as displayed in an Internet browser of a preferred control and display unit for the monitoring and control of street lamps in accordance with the present invention.

For example, FIG. 10 depicts an exemplary HOME SCREEN 200, which is displayed in an Internet browser of a control and display unit 18. In this particular example, a network comprised of seven working components (i.e., fixtures) of an emergency lighting and phone system is being monitored. As shown, the HOME SCREEN 200 generally includes: (1) a map 202 showing the location of the fixtures; (2) a table 204 summarizing the fixtures; and (3) a menu bar 206.

Of course, the map 202 allows the end user to quickly review the location of the individual fixtures relative to one another and relative to geographically referenced features, such as roads, buildings, rivers, and jurisdictional boundaries. Through color-coding or similar techniques, an end user may also be provided with prompt visual indication of the status of the fixtures.

The table 204 provides a summary of the fixtures, specifically (1) the date that the information contained in the table 204 was updated; (2) the number of fixtures; (3) a description of the network of fixtures; and (4) identification of each component of the fixtures.

Figure 11:
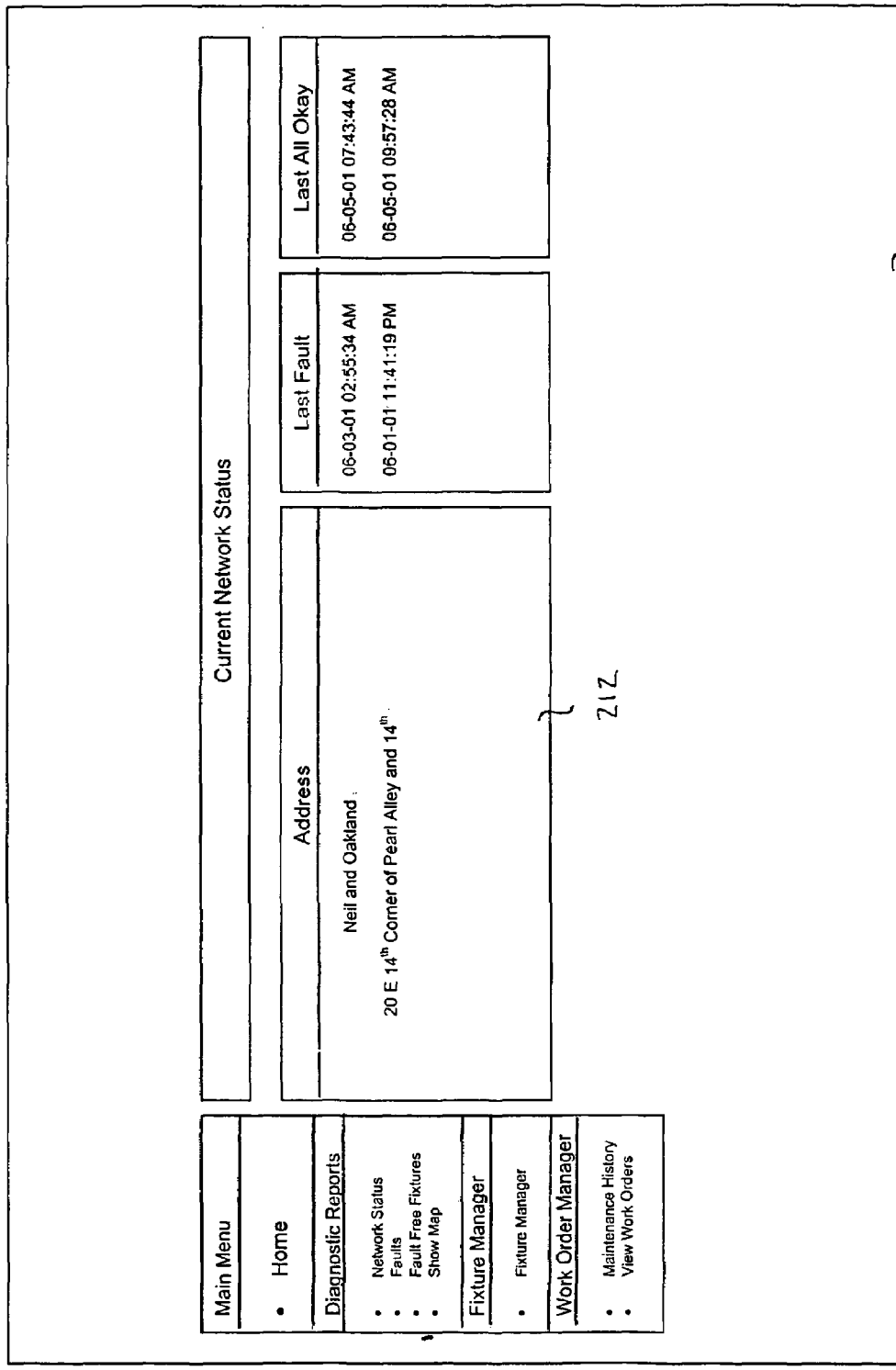
FIG. 11 depicts an exemplary NETWORK STATUS SCREEN, as displayed in an Internet browser of a preferred control and display unit for the monitoring and control of street lamps in accordance with the present invention.

In this example, the menu bar 206 allows for access to various (1) diagnostic reports; (2) a fixture manager; and (3) a work order manager. The available diagnostic reports allow an end user to review the information and data collected from the fixtures. In this regard, FIG. 11 depicts an exemplary NETWORK STATUS SCREEN 210, as displayed in an Internet browser of a control and display unit 18, a diagnostic report that is accessed through the menu bar 206. As shown, the NETWORK STATUS SCREEN 210 includes a table 212 identifying the location of each fixture, the last fault reported, and the last received confirmation of proper operation. In this example, for purposes of brevity and clarity, only two fixtures are displayed in the table 212. Of course, this diagnostic report displayed in FIG. 11 is but one example of numerous reports that could be generated from information and data collected from a network of fixtures or other working components.

Returning to the menu bar 206 of the HOME SCREEN 200 of FIG. 10, the fixture manager allows an end user to review information associated with a particular fixture, to make revisions to such information, and/or to control the operation and function of the fixture. In this regard, FIG. 12 depicts an exemplary FIXTURE MANAGER SCREEN 220 for a particular fixture as displayed in an Internet browser of a preferred control and display unit 18. The FIXTURE MANAGER SCREEN 220 includes a table 222 identifying (1) the location of the fixture; (2) the description of the fixture; (3) components of the fixture by manufacturer and model number; (4) component specifications; (5) subcomponents of the fixture by manufacturer and model number; (6) subcomponent specifications; and (7) fixture modification history. Furthermore, and perhaps most importantly, the FIXTURE MANAGER SCREEN 220 includes a "Modify Information" button 224 which allows an end user to modify the information contained in the table 222. In certain embodiments, selection of the "Modify Information" button 224 or similar button may further allow for operational control of the fixture.

Lastly, although not shown in the Figures, the menu bar 206 also allows an end user to access a work order manager for generating or reviewing work orders associated with the maintenance of the fixtures.

From the foregoing description, it should be clear that the implementation of the method and system of the present invention as described herein therefore allows for the monitoring and control of working components through low-powered, short-distance radio communications. As depicted in FIG. 1, each transceiver module 12 that is secured to a working component in a particular network or area is aware of its immediate neighboring transceiver modules 12 and the designated (most efficient) path to the area control module 14, said area control module 14 subsequently transmitting the collected messages to a network support server 16. Importantly, transmission of messages from a particular transceiver module 12' to the area control module 14 is accomplished through a number of intermediate transmissions through other transceiver modules 12. For further explanation of this network structure, reference is made to FIGS. 7–9.

Figure 7:
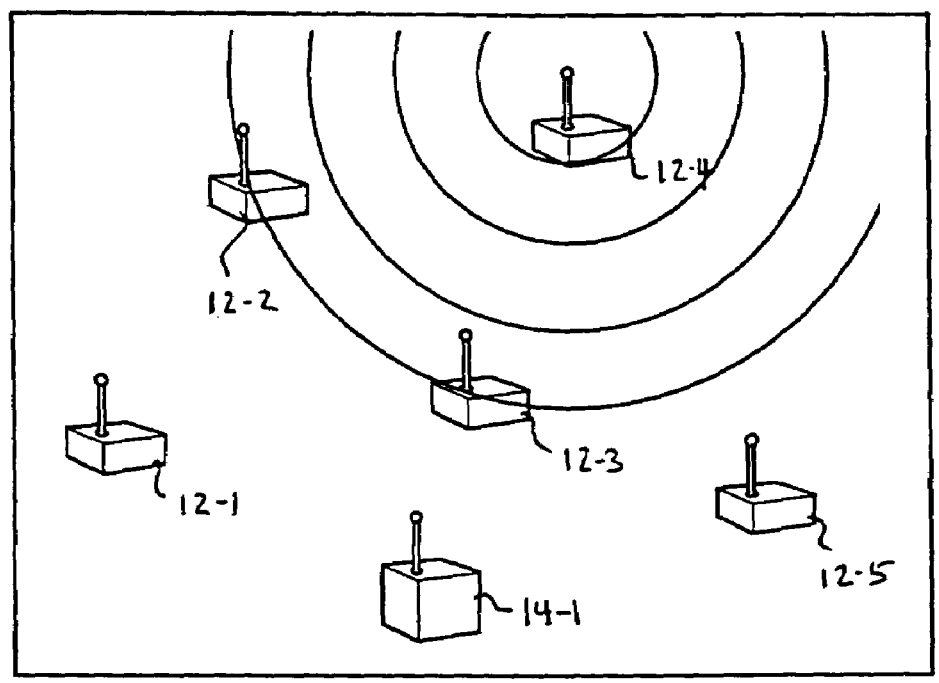
FIG. 7 depicts a configuration of five individual transceiver modules and a single area control module in accordance with the method and system of the present invention, and further illustrates the transmission range of one of the transceiver modules.
Figure 8:
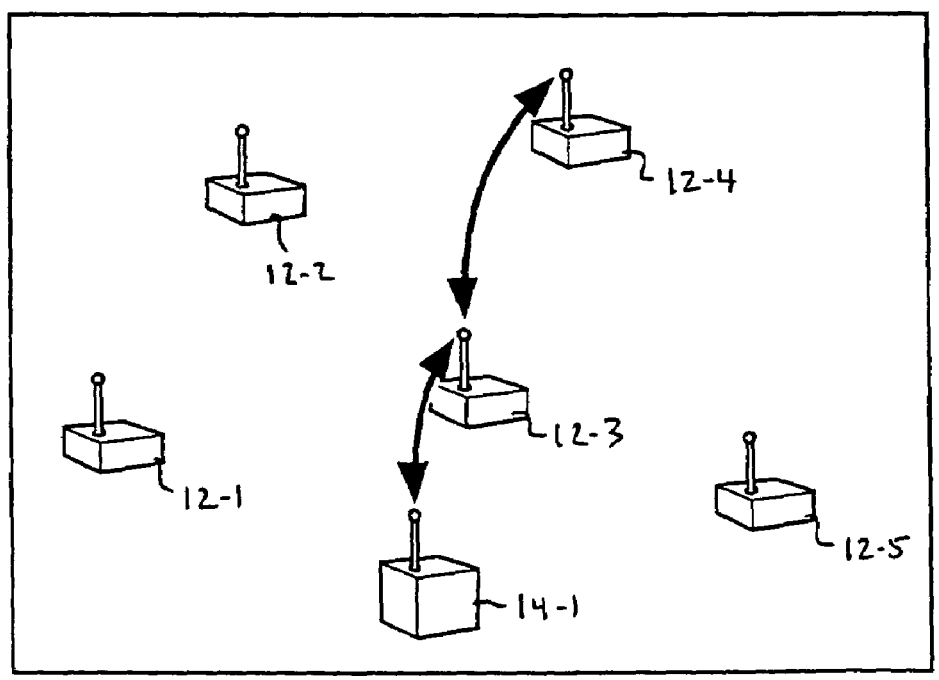
FIG. 8 depicts the preferred path for transmissions from one transceiver module to the area control module in the configuration of FIG. 7.

FIG. 7 depicts five individual transceiver modules, respectively indicated by reference numerals 12-1, 12-2, 12-3, 12-4, and 12-5; and a single area control module 14-1. Referring to transceiver module 12-4, messages transmitted from this transceiver module 12-4 could be communicated to the area control module 14-1 through any of a number of different and distinct paths. As shown, in this configuration, transceiver module 12-4 can effectively transmit messages to transceiver modules 12-2 and 12-3. Of course, the preferred path to the area control module 14-1 is the most efficient path, which is through transceiver module 12-3, as indicated by arrows in FIG. 8.

Figure 9:
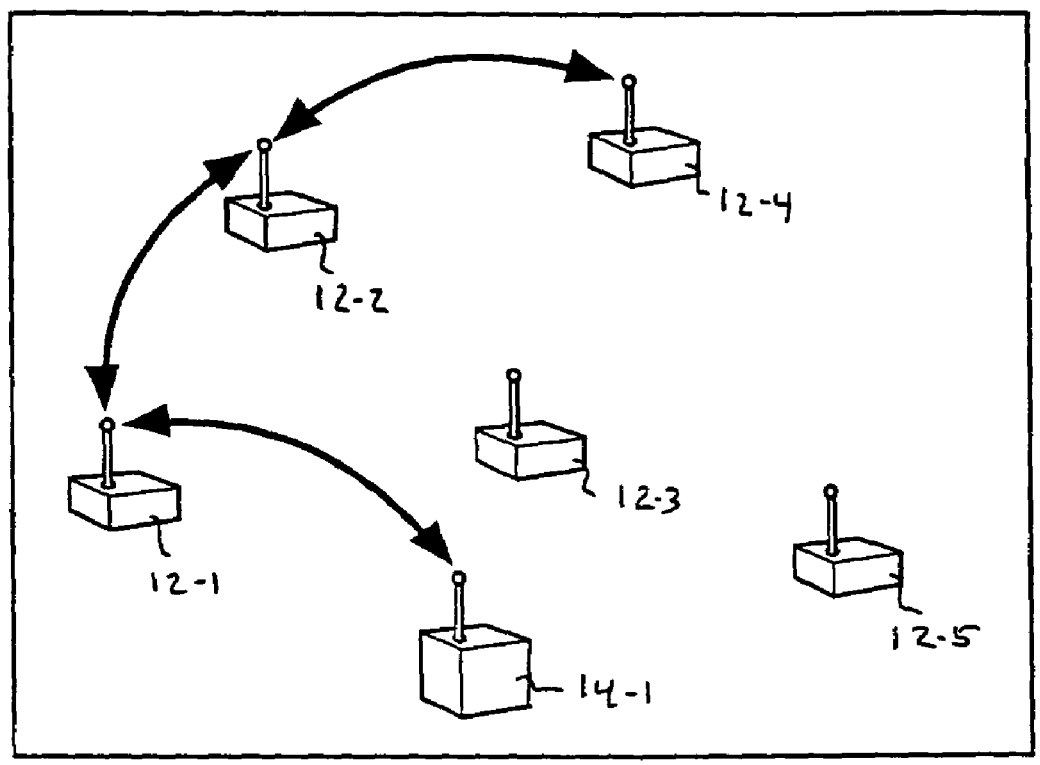
FIG. 9 depicts an alternate path for transmissions from one transceiver module to the area control module in the configuration of FIG. 7.

However, in the event that transceiver module 12-3 in not functioning properly, an alternate path can be configured from transceiver module 12-4 to the area control module 14-1 through transceiver modules 12-2 and 12-1, as indicated by the arrows in FIG. 9. Quite clearly, depending on the number of transceiver modules 12 that comprise a particular network, there are numerous paths that a particular message can take from the transceiver module from which it originates to the area control module 14-1, thereby ensuring reliable delivery of all messages to the area control module 14-1.

It will be obvious to those skilled in the art that modifications may be made to the preferred embodiments described herein without departing from the spirit and scope of the present invention.

The invention claimed is:

1. A method for communicating information related to a plurality of working components of a system monitored by a utility arranged in a local cluster, and from each such working component to a central location, comprising the steps of:

attaching and operably connecting a low power transceiver module to each working component of the system monitored by a utility, said transceiver module including at least a microcontroller and a radio transceiver; and positioning an area control module in the vicinity of the plurality of working components in the local cluster, said area control module including at least a microprocessor and a radio transceiver, and said area control module being in communication with said central location;

wherein each working component in the local cluster itself initiates determination of an initial best path to the area control module without any prior knowledge of the area control module, and wherein, upon occurrence of a predetermined event, the microcontroller associated with one of said transceiver modules initiating transmission of a message through the radio transceiver, said message containing the identification of and the status of the working component;
the message being received by the radio transceivers associated with one or more neighboring transceiver modules;
each of said receiving transceiver modules making a decision as to whether to re-transmit said message based on a determination of whether the transceiver module is on the best path between the transceiver module from which the message originated and the area control module;
re-transmission of the message continuing along said best path until the message is received at the area control module; and
said area control module communicating said message to the central location.

2. A method as recited in claim 1, in which a control message containing instructions can be initiated from the central location, communicated to the area control module for subsequent transmission to one or more intended transceiver modules, said area control module transmitting the message to one or more receiving transceiver modules within its transmission range, each of the receiving transceiver modules making a decision as to whether to re-transmit said message based on a determination of whether the receiving transceiver module is on a designated path between the area control module and the one or more intended transceiver modules.

3. A method as recited in claim 2, in which the one or more intended transceiver modules, upon receipt of the control message, execute the instructions contained therein.

4. A method as recited in claim 3, in which each transceiver module further includes at least one actuation component for manipulating the operation of the working component based on instructions contained in the control message.

5. A method as recited in claim 2, in which said predetermined event is the receipt of a control message.

6. A method as recited in claim 1, in which each transceiver module further includes one or more sensors for sensing various operational parameters representative of the status of the working component to which the transceiver module is secured, each such sensor communicating the status information to the microcontroller of the transceiver module for interpretation by a diagnostics processor integral to the microcontroller and then subsequent transmission through the radio transceiver.

7. A method as recited in claim 6, in which each transceiver module further includes at least one actuation component for manipulating the operation of the working component in response to the status information communicated to the microcontroller from the one or more sensors.

8. A method as recited in claim 6, in which said predetermined event is the receipt of certain status information by the microcontroller.

9. A method as recited in claim 1, in which said predetermined event is a prompt based on a predetermined schedule.

10. A method as recited in claim 1, in which the microcontroller of each said transceiver module executes embedded code stored in an associated memory for coordinating function and control of the transceiver module.

11. A method as recited in claim 10, in which a unique code is stored in the associated memory for identifying the particular transceiver module.

12. A method as recited in claim 10, in which information and data associated with the maintenance and operation of the working component is also stored in the associated memory.

13. A method as recited in claim 1, in which the radio transceivers associated with each transceiver module operate in an unlicensed band.

14. A method as recited in claim 1, in which the radio transceivers associated with each transceiver module operate at power levels no more than 500 mW.

15. A method as recited in claim 1, in which the microcontroller of the transceiver module has an integral clock function.

16. A method as recited in claim 1, wherein the system monitored by the utility comprises a street lighting unit, a water, electric, or gas meter, or a water pump.

17. A system for communicating information related to a plurality of working components of a system monitored by a utility arranged in a local cluster, comprising:
a plurality of low power transceiver modules, each such transceiver module being secured and operably connected to each working component of the system monitored by a utility, each such transceiver module including at least a microcontroller and a radio transceiver; and
at least one area control module positioned in the vicinity of the plurality of transceiver modules in the local cluster, said area control module including at least a microprocessor and a radio transceiver,
wherein each working component in the local cluster itself initiates determination of an initial best path to the area control module without any prior knowledge of the area control module and itself dynamically initiates update of the best path to the area control module;
a network support server in communication with said area control module; and one or more display and control units in communication with said network support server;
wherein, upon occurrence of a predetermined event,
the microcontroller associated with one of said transceiver modules initiating transmission of a message through the radio transceiver, said message containing the identification of and the status of the working component;
the message being received by the radio transceivers associated with one or more neighboring transceiver modules;
each of said receiving transceiver modules making a decision as to whether to re-transmit said message based on a determination of whether the transceiver module is on the best path between the transceiver module from which the message originated and the area control module;
re-transmission of the message continuing along said designated path until the message is received at the area control module;
said area control module communicating said message to the network support server; and
said network support server analyzing said message, and communicating the status information contained therein to the one or more display and control units for review by an end user.

18. A system as recited in claim 17, in which the end user can initiate a control message containing instructions through the display and control units, said message being communicated to the area control module through the network support server for subsequent transmission to one or more intended transceiver modules, said area control module transmitting the message to one or more receiving transceiver modules within its transmission range, each of the receiving transceiver modules making a decision as to whether to re-transmit said message based on a determination of whether the receiving transceiver module is on the best path between the area control module and the one or more intended transceiver modules.

19. A system as recited in claim 18, in which the one or more intended transceiver modules, upon receipt of the control message, execute the instructions contained therein.

20. A system as recited in claim 19, in which each transceiver module further includes at least one actuation component for manipulating the operation of the working component based on instructions contained in the control message.

21. A system as recited in claim 18, in which said predetermined event is the receipt of a control message.

22. A system as recited in claim 17, in which each transceiver module further includes one or more sensors for sensing various operational parameters representative of the status of the working component to which it is secured, each such sensor communicating such status information to the microcontroller of the transceiver module for interpretation by a diagnostics processor integral to the microcontroller and then subsequent transmission through the radio transceiver.

23. A system as recited in claim 22, in which each transceiver module further includes at least one actuation component for manipulating the operation of the working component in response to the status information communicated to the microcontroller from the one or more sensors.

24. A system as recited in claim 22, in which said predetermined event is the receipt of certain status information by the microcontroller.

25. A system as recited in claim 17, in which said predetermined event is a prompt based on a predetermined schedule.

26. A system as recited in claim 17, in which the microcontroller of each said transceiver module executes embedded code stored in an associated memory for coordinating function and control of the transceiver module.

27. A system as recited in claim 26, in which a unique code is stored in the associated memory for identifying the particular transceiver module.

28. A system as recited in claim 26 in which information and data associated with the maintenance and operation of the working component is also stored in the associated memory.

29. A system as recited in claim 17, in which the radio transceivers associated with each transceiver module operate in an unlicensed band.

30. A system as recited in claim 17, in which the radio transceivers associated with each transceiver module operate at power levels no more than 500 mW.

31. A system as recited in claim 17, wherein the system monitored by the utility comprises a street lighting unit, a water, electric, or gas meter, or a water pump.

32. A communications network for the monitoring and control of a plurality of independent working components of a system monitored by a utility arranged in a local cluster, comprising:

a plurality of low power transceiver modules, each such transceiver module being secured and operably connected to one of said working components of the system monitored by a utility, each such transceiver module including at least a microcontroller for controlling operation and function of the transceiver module, and a radio transceiver;

at least one area control module positioned in the vicinity of the plurality of transceiver modules in the local cluster, said area control module including at least a microprocessor and a radio transceiver, wherein each working component in the local cluster itself initiates determination of an initial best path to the area control module without any prior knowledge of the area control module;

a network support server in communication with said area control module; and one or more display and control units in communication with said network support server;

wherein a diagnostics message from one of said transceiver modules containing status information associated with the working component to which said one transceiver module is secured is (a) transmitted through the radio transceiver associated with the transceiver module, (b) received by one or more neighboring transceiver modules, (c) selectively re-transmitted by receiving transceiver modules if determined to be on the best path until received by the area control module, and (d) communicated to the network support server by the area control module;

said network support server analyzing said message, and communicating the status information contained therein to the one or more display and control units for review by an end user.

33. A communications network as recited in claim 32, wherein a control message initiated by the end user through one of the control and display units, and containing instructions for one or more intended transceiver modules, is (a) communicated to the network support server, (b) communicated from the network support server to the area control module, (c) transmitted by the area control module to one or more receiving transceiver modules within its transmission range, (d) selectively re-transmitted by the receiving transceiver modules if determined to be on a designated path until received by the one or more intended transceiver modules;

each of the intended transceiver modules, upon receipt of the control message, executing the instructions contained therein.

34. A communication network as recited in claim 33, in which the control and display units are in communication with the network support server through an information network.

35. A communication network as recited in claim 34, in which the information network is the Internet.

36. A communications network as recited in claim 32, wherein the system monitored by the utility comprises a street lighting unit, a water, electric, or gas meter, or a water pump.

37. A method for communicating information related to a plurality of working components of system monitored by a utility arranged in a local cluster, from each such working component to a network access point, comprising the steps of:

attaching and operably connecting a low power transceiver module to each working component of the system monitored by a utility, said transceiver module including at least a microcontroller for controlling operation and function of the transceiver module, and a radio transceiver, wherein each working component in the local cluster itself initiates determination of an initial best path to the network access point without any prior knowledge of the area control module;

wherein, upon occurrence of a predetermined event,
the microcontroller associated with one of said transceiver modules initiating transmission of a message through the radio transceiver, said message containing the identification of and the status of the working component;

the message being received by the radio transceivers associated with one or more neighboring transceiver modules;

each of said neighboring transceiver modules making a decision as to whether to re-transmit said message based on a determination of whether the transceiver module is on the best path between the transceiver module from which the message originated and the network access point;

re-transmission of the message continuing along said best path until the message is received at the network access point.

38. A method as recited in claim 37, in which a control message containing instructions can be transmitted from the network access point to one or more intended transceiver modules by transmitting the message to one or more receiving transceiver modules within transmission range of the network access point, each of the receiving transceiver modules making a decision as to whether to re-transmit said message based on a determination of whether the receiving transceiver module is on a designated path between the network access point and the one or more intended transceiver modules.

39. A method as recited in claim 37, wherein the system monitored by the utility comprises a street lighting unit, a water, electric, or gas meter, or a water pump.

40. A method for communicating information related to a plurality of working components of a system monitored by a utility arranged in a local cluster from each such working component to a central location, comprising the steps of:

attaching and operably connecting a transceiver module to each working component of the system monitored by a utility, said transceiver module including at least a microcontroller and a radio transceiver operating at a power level of no more than 500 mW; and positioning an area control module in the vicinity of the plurality of working components in the local cluster, said area control module including at least a microprocessor and a radio transceiver, and said area control module being in communication with said central location, wherein each working component in the local cluster itself initiates determination an initial best path to the area control module without any prior knowledge of the area control module;

wherein, upon occurrence of a predetermined event,
the microcontroller associated with one of said transceiver modules initiating transmission of a message through the radio transceiver, said message containing the identification of and the status of the working component;

the message being received by the radio transceivers associated with one or more neighboring transceiver modules;

each of said receiving transceiver modules making a decision as to whether to re-transmit said message based on a determination of whether the transceiver module is on the best path between the transceiver module from which the message originated and the area control module;

re-transmission of the message continuing along said best path until the message is received at the area control module; and said area control module communicating said message to the central location.

41. A method as recited in claim 40, wherein the system monitored by the utility comprises a street lighting unit, a water, electric, or gas meter, or a water pump.

42. A method for communicating information related to a plurality of working components of a system monitored by a utility arranged in a local cluster, from each such working component to a central location, comprising the steps of:

attaching and operably connecting a low power transceiver module to each working component of the system monitored by the utility, said transceiver module including at least a microcontroller and a radio transceiver operating in the 902 MHz to 928 MHz frequency band or the 2.40 GHz to 2.48 GHz frequency band; and positioning an area control module in the vicinity of the plurality of working components in the local cluster, said area control module including at least a microprocessor and a radio transceiver, and said area control module being in communication with said central location, wherein each working component in the local cluster itself initiates determination of an initial best path to the area control module without any prior knowledge of the area control module;

wherein, upon occurrence of a predetermined event,
the microcontroller associated with one of said transceiver modules initiating transmission of a message through the radio transceiver, said message containing the identification of and the status of the working component;

the message being received by the radio transceivers associated with one or more neighboring transceiver modules;

each of said receiving transceiver modules making a decision as to whether to re-transmit said message based on a determination of whether the transceiver module is on the best path between the transceiver module from which the message originated and the area control module;

re-transmission of the message continuing along said best path until the message is received at the area control module; and said area control module communicating said message to the central location.

43. A method as recited in claim 42, wherein the system monitored by the utility comprises a street lighting unit, a water, electric, or gas meter, or a water pump.

* * * * *